DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED DECEMBER 2, 1975

941 O.G. 9

T941,020

POLYOLEFIN FILMS AND METHODS FOR MAKING SAME

Roger Neville Young, Chesham, England, assignor to Imperial Chemical Industry Limited, London, England

Filed Nov. 13, 1974, Ser. No. 523,530
Claims priority, application Great Britain, Dec. 21, 1973, 59,338/73
Int. Cl. B32b *27/30, 27/32*
U.S. Cl. 428—349
1 Sheet Drawing. 21 Pages Specification

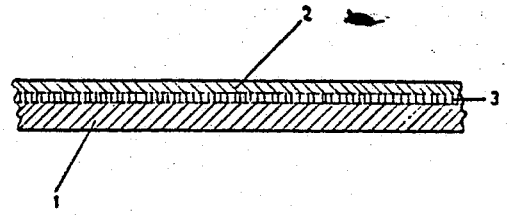

A heat sealable film for use in packaging comprising a polyolefin film substrate at least one surface of which is coated with a layer of a heat sealable material, wherein the film substrate is formed from a composition comprising a blend of from 87.5 to 60 parts by weight of polypropylene and from 12.5 to 40 parts by weight of a block copolymer of ethylene and propylene, the copolymer containing from 0.5 to 40% by weight of ethylene, based on the weight of the copolymer, and the blend containing from 0.2 to 5% by weight of ethylene, based on the weight of the blend.

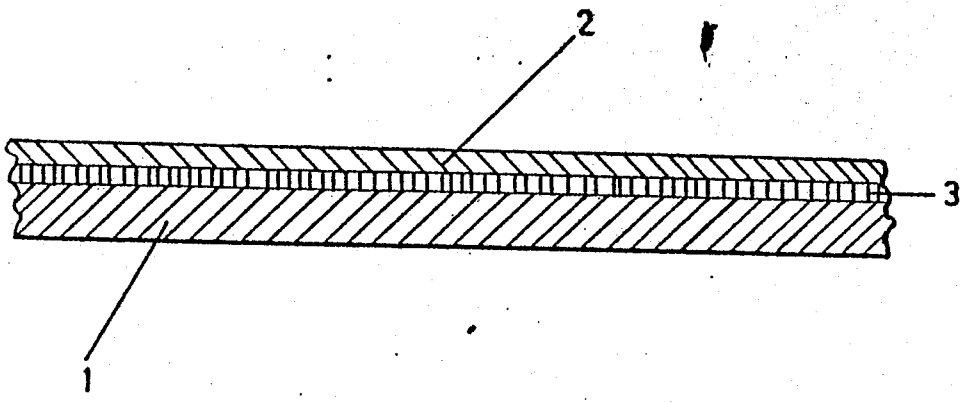

POLYOLEFIN FILMS AND METHODS FOR MAKING SAME
Original Filed Nov. 13, 1974